(12) United States Patent
Ou et al.

(10) Patent No.: US 10,939,451 B2
(45) Date of Patent: Mar. 2, 2021

(54) DATA TRANSMISSION METHOD, HOST UNIT, EXTENSION UNIT, AND BASE STATION SYSTEM

(71) Applicant: Comba Telecom Technology (Guangzhou) Limited, Guangzhou (CN)

(72) Inventors: Yang Ou, Guangzhou (CN); Huijun Xu, Guangzhou (CN); Zhen Liu, Guangzhou (CN); Baoguo Ding, Guangzhou (CN); Bo Yang, Guangzhou (CN); Pengfei Huang, Guangzhou (CN)

(73) Assignee: Comba Telecom Technology (Guangzhou) Limited, Guangzhou (CN)

(*) Notice: Subject to any disclaimer, the term of this patent is extended or adjusted under 35 U.S.C. 154(b) by 25 days.

(21) Appl. No.: 16/731,201

(22) Filed: Dec. 31, 2019

(65) Prior Publication Data

US 2020/0404675 A1 Dec. 24, 2020

(30) Foreign Application Priority Data

Jun. 24, 2019 (CN) .......................... 201910548589.1

(51) Int. Cl.
*H04W 72/04* (2009.01)
*H04W 72/08* (2009.01)
*H04L 5/00* (2006.01)

(52) U.S. Cl.
CPC ......... *H04W 72/08* (2013.01); *H04W 72/044* (2013.01); *H04L 5/0048* (2013.01)

(58) Field of Classification Search
CPC ............................. H04W 16/26; H04W 72/04
See application file for complete search history.

(56) References Cited

U.S. PATENT DOCUMENTS 8,472,409 B2 6/2013 Sun et al.
9,356,764 B2 5/2016 Nama et al.
(Continued)

FOREIGN PATENT DOCUMENTS

CN 101610135 A 12/2009
CN 101741470 A 6/2010
(Continued)

OTHER PUBLICATIONS

Chinese Office Action for Application No. 201910548589.1 dated Jun. 3, 2020, 8 pages.
(Continued)

*Primary Examiner* — Abdelillah Elmejjarmi
(74) *Attorney, Agent, or Firm* — Seyfarth Shaw LLP

(57) ABSTRACT

The present application relates to a data transmission method, a host unit, an extension unit, a base station system, and a readable storage medium. The method is applied to a base station system, the base station system includes: a host unit, a plurality of extension units, and a plurality of remote units; the host unit is communicatively connected to the extension units, and each of the extension units is communicatively connected to at least one of the remote units, which includes: the host unit determines a target extension unit corresponding to the user equipment from the extension units according to uplink signal respectively received from the extension units; the uplink signal sent by each extension unit is used to indicate a quality state of signaling between the remote unit connected to the extension unit and the user equipment; sends instruction information to the target extension unit; the instruction information is used to instruct the target extension unit to send uplink data of the user equipment received from the remote unit to the host unit; and receives the uplink data sent by the target extension unit.

(Continued)

Using this method can reduce the requirement for the front-haul bandwidth.

13 Claims, 6 Drawing Sheets

(56) References Cited

U.S. PATENT DOCUMENTS

| | | |
|---|---|---|
| 10,292,175 B2 | 5/2019 | Eyuboglu et al. |
| 2013/0201857 A1* | 8/2013 | Bhargava ................ H04K 3/28 370/252 |
| 2015/0181615 A1 | 6/2015 | Golubovic et al. |
| 2018/0145720 A1* | 5/2018 | Hanson ............ H04W 72/1273 |
| 2019/0191019 A1 | 6/2019 | Jia et al. |

FOREIGN PATENT DOCUMENTS

| | | | |
|---|---|---|---|
| CN | 107786508 A | 3/2018 | |
| CN | 108365917 A | 8/2018 | |
| CN | 108513325 A | 9/2018 | |
| EP | 3094156 A1 | 11/2016 | |
| EP | 3152970 A2 | 4/2017 | |
| WO | 2015191530 A2 | 12/2015 | |
| WO | WO2016167121 A1 * | 10/2016 | ............. H04W 4/04 |
| WO | 2018157740 A1 | 9/2018 | |
| WO | WO2019219898 A1 * | 11/2019 | ............ H04W 24/02 |

OTHER PUBLICATIONS

Chinese Search Report for Application No. 201910548589.1 dated Jun. 3, 2020, 2 pages.

* cited by examiner

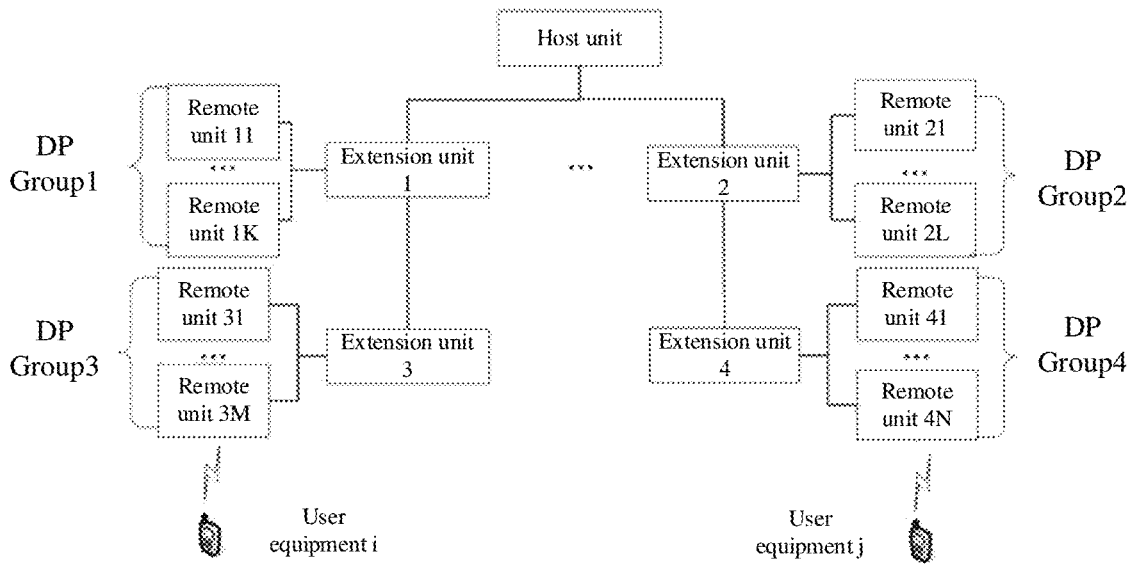

FIG. 1

The host unit determines a target extension unit corresponding to the user equipment from the extension units according to uplink signal respectively received from the extension units; the uplink signal sent by each extension unit is used to indicate a quality state of signaling between the remote unit connected to the extension unit and the user equipment.  201

The host unit send instruction information to the target extension unit; the instruction information is used to instruct the target extension unit to send uplink data of the user equipment received from the remote unit to the host unit.  202

The host unit receives the uplink data sent by the target extension unit.  203

FIG.2

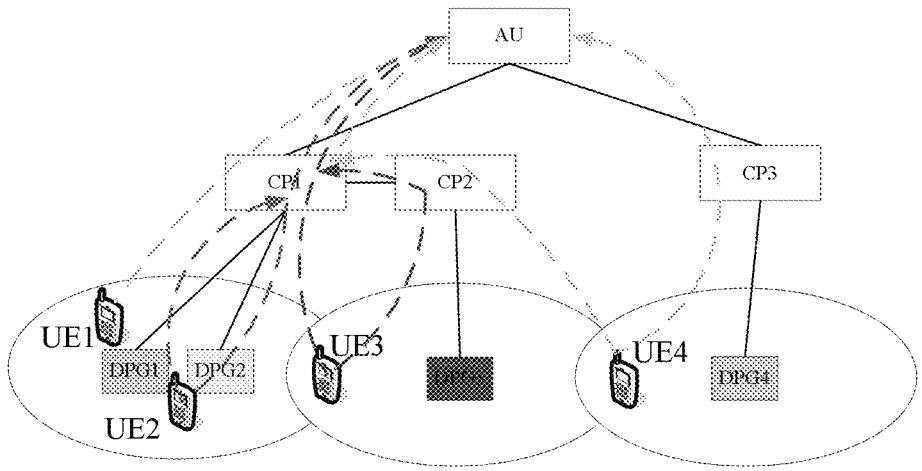

The target extension unit of the extension units corresponding to the user equipment receives instruction information from the host unit; the target extension unit is determined by the host unit according to uplink signal respectively received from the extension units, the uplink signal is used to indicate a quality state of signaling between the remote unit connected to the extension unit and the user equipment; the instruction information is used to instruct the target extension unit to send the uplink data of the user equipment received from the remote unit to the host unit.  701

↓

The target extension unit sends the uplink data of the user equipment among the received uplink data to the host unit according to the instruction information, after receiving the uplink data sent by the remote unit.  702

The target extension unit receives downlink data from the host unit; the downlink data is data to be sent by the host unit to the user equipment.  801

↓

The target extension unit sends the downlink data to the user equipment through a remote unit connected to the target extension unit according to the instruction information.  802

FIG. 8

DATA TRANSMISSION METHOD, HOST UNIT, EXTENSION UNIT, AND BASE STATION SYSTEM

CROSS REFERENCE TO RELATED APPLICATIONS

This patent application claims priority to Chinese patent application No. 201910548589.1, filed on Jun. 24, 2019, the disclosure of which is hereby incorporated by reference in its entirety.

TECHNICAL FIELD

The present disclosure relates to the field of communications technologies, and more particularly, to a data transmission method, a host unit, an extension unit, a base station system, and a readable storage medium.

BACKGROUND

At present, a base station system including a host unit, a plurality of extension units and a plurality of remote units is proposed for improving the signal coverage. The host unit is communicatively connected to the extension units, and one extension unit is communicatively connected to several remote units.

In the conventional technology, when a host unit in a base station system communicates with a user equipment (UE), it is required to send data to or receive data from the UE through all the extension units and all the remote units in the base station system. Specifically, take an uplink process as an example, each remote unit in the communication system receives uplink data on an uplink time-frequency resource position of the UE, each remote unit sends, after receiving the uplink data, the received uplink data to the extension units connected thereto, and each extension unit further sends the received uplink data to the host unit for processing.

SUMMARY

With the conventional technology, the host unit needs to receive and process the data received by all the remote units on the uplink time-frequency resource position of the UE. Therefore, the conventional technology has a problem that there is an excessive requirement to the bandwidth of front-haul transmission between the host unit and the extension unit.

Based on this, it is necessary to provide a data transmission method, a host unit, an extension unit, a base station system, and a readable storage medium capable of reducing the front-haul bandwidth requirement for the above technical problem.

According to a first aspect of the disclosure, provided herein is a data transmission method, applied to a base station system, the base station system includes: a host unit, a plurality of extension units, and a plurality of remote units; the host unit is communicatively connected to the extension units, each of the extension units is communicatively connected to at least one of the remote units, and the remote units are configured to communicatively connected to user equipment to enable the user equipment to access the base station system; for any user equipment accessing the base station system, the method includes:

determining, by the host unit, a target extension unit corresponding to the user equipment from the extension units according to uplink signal respectively received from the extension units; the uplink signal sent by each extension unit is used to indicate a quality state of signaling between the remote unit connected to the extension unit and the user equipment;

sending, by the host unit, instruction information to the target extension unit; the instruction information is used to instruct the target extension unit to send uplink data of the user equipment received from the remote unit to the host unit;

receiving, by the host unit, the uplink data sent by the target extension unit.

In an embodiment, the method further includes:

sending, by the host unit, downlink data to the target extension unit; the downlink data is data to be sent by the host unit to the user equipment.

In an embodiment, the remote units are divided into a plurality of remote unit groups, each extension unit is communicatively connected to at least one of the remote unit groups; the uplink signal sent by each extension unit is used to indicate a quality state of signaling between each remote unit group connected to the extension unit and the user equipment;

determining, by the host unit, the target extension unit corresponding to the user equipment from the extension units according to uplink signal respectively received from the extension units, includes:

selecting, by the host unit, at least one remote unit group from the remote unit groups as a service remote unit group corresponding to the user equipment according to the uplink signal respectively received from the extension units; and determining, by the host unit, the extension unit connected to the service remote unit group as the target extension unit.

In an embodiment, the instruction information includes an identifier of the service remote unit group.

In an embodiment, receiving by the host unit the uplink data sent by the target extension unit includes:

receiving, by the host unit and from the target extension unit, the uplink data sent by the service remote unit groups; the uplink data are sent by the user equipment to the service remote unit groups; and performing, by the host unit, diversity and combining processing on the uplink data sent by the service remote unit groups.

In an embodiment, selecting by the host unit at least one remote unit group from the remote unit groups as a service remote unit group corresponding to the user equipment according to the uplink signal respectively received from the extension units includes:

determining, by the host unit and according to each uplink signal respectively received from the extension units, whether there is a remote unit group that satisfies a signal quality condition; the signal quality condition includes: a signal to noise ratio of a signal between the remote unit group and the user equipment is greater than a signal to noise ratio threshold;

if there is a remote unit group that satisfies the signal quality condition, selecting, by the host unit, among the remote unit groups, one remote unit group having the largest signal to noise ratio as the service remote unit group.

In an embodiment, the method further includes:

if there is no remote unit group that satisfies the signal quality condition, selecting, by the host unit, among the remote unit groups, a plurality of remote unit groups whose signal to noise ratio are ranked first in order from large to small as the service remote unit group.

In an embodiment, the service remote unit group includes a first service remote unit group and a second service remote unit group; the first service remote unit group is communicatively connected to a first extension unit of the extension units, the second service remote unit group is communicatively connected to a second extension unit of the extension units; the first extension unit is communicatively connected to the host unit, the second extension unit is communicatively connected to the first extension unit; the target extension unit includes the first extension unit.

In an embodiment, the host unit and the extension unit are connected through enhanced Common Public Radio Interface.

According to a second aspect of the disclosure, provided herein is a data transmission method, applied to a base station system, the base station system includes: a host unit, a plurality of extension units, and a plurality of remote units; the host unit is communicatively connected to the extension units, each of the extension units is communicatively connected to at least one of the remote units, and the remote units are configured to communicatively connected to user equipment to enable the user equipment to access the base station system; for any user equipment accessing the base station system, the method includes:

receiving, by a target extension unit of the extension units corresponding to the user equipment, instruction information from the host unit; the target extension unit is determined by the host unit according to uplink signal respectively received from the extension units, the uplink signal is used to indicate a quality state of signaling between the remote unit connected to the extension unit and the user equipment; the instruction information is used to instruct the target extension unit to send uplink data of the user equipment received from the remote unit to the host unit;

sending, by the target extension unit and after receiving the uplink data sent by the remote unit, the uplink data of the user equipment among the received uplink data to the host unit according to the instruction information.

In an embodiment, further includes:

receiving, by the target extension unit, downlink data from the host unit; the downlink data is data to be sent by the host unit to the user equipment; and sending, by the target extension unit, the downlink data to the user equipment through a remote unit connected to the target extension unit according to the instruction information.

In an embodiment, the remote units are divided into a plurality of remote unit groups, each of the extension units is communicatively connected to at least one of the remote unit groups; the target extension unit is communicatively connected to the service remote unit group corresponding to the user equipment; the service remote unit group is determined by the host unit according to uplink signal respectively received from the extension units, the uplink signal sent by one extension unit of the extension units is used to indicate a quality state of signaling between each remote unit group connected to the extension unit and the user equipment.

In an embodiment, the instruction information includes an identifier of the service remote unit group; and sending by the target extension unit and after receiving the uplink data sent by the remote unit the uplink data of the user equipment among the received uplink data to the host unit according to the instruction information includes:

parsing, by the target extension unit, the uplink data of the user equipment from the uplink data sent by the service remote unit group according to the identifier of the service remote unit group and a time-frequency resource position corresponding to uplink scheduling information of the user equipment, and sending, by the target extension unit, the uplink data of the user equipment to the host unit.

In an embodiment, parsing the uplink data of the user equipment from the uplink data sent by the service remote unit group includes:

performing, by the target extension unit, low physical layer processing on radio frequency signal sent by the service remote unit group according to the time-frequency resource position corresponding to the time-frequency resource position corresponding to the uplink scheduling information of the user equipment, and obtaining PHY-L processed symbol data; the radio frequency signal carries the uplink data.

In an embodiment, sending by the target extension unit the downlink data to the user equipment through a remote unit connected to the target extension unit according to the instruction information includes:

sending, by the target extension unit and according to the identifier of the service remote unit group, the downlink data to the user equipment through the service remote unit group on a time-frequency resource position corresponding to downlink scheduling information of the user equipment.

According to a third aspect of the disclosure, provided herein is a host unit, applied to a base station system, the base station system includes: a host unit, a plurality of extension units, and a plurality of remote units; the host unit is communicatively connected to the extension units, each of the extension units is communicatively connected to at least one of the remote units, and the remote units are configured to communicatively connected to user equipment so enable the user equipment to access the base station system; for any user equipment accessing the base station system, the host unit includes:

a first processing unit, configured to determine by the host unit a target extension unit corresponding to the user equipment from the extension units according to uplink signal respectively received from the extension units; the uplink signal sent by each extension unit is used to indicate a quality state of signaling between the remote unit connected to the extension unit and the user equipment;

a first sending unit, configured to send by the host unit instruction information to the target extension unit; the instruction information is used to instruct the target extension unit to send uplink data of the user equipment received from the remote unit to the host unit; and a first receiving unit, configured to receive by the host unit the uplink data sent by the target extension unit.

According to a fourth aspect of the disclosure, provided herein is an extension unit, applied to a base station system, the base station system includes: a host unit, a plurality of extension units, and a plurality of remote units; the host unit is communicatively connected to the extension units, each of the extension units is communicatively connected to at least one of the remote units, and the remote units are configured to communicatively connected to user equipment to enable the user equipment to access the base station system; for any user equipment accessing the base station system, the extension unit includes:

a second receiving unit, configured to receive by a target extension unit of the extension units corresponding to the user equipment, instruction information from the host unit; the target extension unit is determined by the host unit according to uplink signal respectively received from the extension units, the uplink signal is used to indicate a quality state of signaling between the remote unit connected to the extension unit and the user equipment; the instruction information is used to instruct the target extension unit to send uplink data of the user equipment received from the remote unit to the host unit; and a second sending unit, configured to send by the target extension unit and after receiving the uplink data sent by the remote unit, the uplink data of the user equipment among the received uplink data to the host unit according to the instruction information.

In an embodiment, further includes:

a second processing module, configured to perform low physical layer processing on the uplink data and/or downlink data of the user equipment according to a time-frequency resource position allocated to the user equipment, and perform data transmission between the user equipment and the host unit according to the low physical layer processed uplink data and/or downlink data.

According to a fifth aspect of the disclosure, provided herein is a base station system, including the host unit according to the third aspect, a plurality of the extension units according to the fourth aspect, and a plurality of remote units; the host unit is communicatively connected to the extension units, and each of the extension units is communicatively connected to at least one of the remote units.

According to a sixth aspect of the disclosure, provided herein is a readable storage medium storing computer programs, which, when executed by a processor, performs steps of the method of the first aspect and/or steps of the method of the second aspect.

Compared with that the amount of uplink data received by the host unit is strongly correlated with the number of all the remote units in the conventional technical solution, for the above data transmission method, the host unit, the extension unit, the base station system, and the readable storage medium, the amount of the uplink data received by the host unit in the examples is only strongly correlated with the number of remote units connected to the target extension unit, that is, the transmitting amount of the uplink data is greatly reduced, thereby reducing the requirement for uplink front-haul bandwidth; meanwhile, since the host unit further needs to process the uplink data, so that the embodiments further reduces the requirement for the processing capabilities (such as modulation and demodulation capabilities) of the host unit, thereby the cost of the host unit can be reduced comprehensively.

BRIEF DESCRIPTION OF THE DRAWINGS

FIG. 1 is an application environment diagram illustrating a data transmission method provided by an embodiment.

FIG. 2 is a schematic flow chart of a data transmission method provided by an embodiment.

FIG. 6 is a schematic diagram illustrating a user equipment, a service remote unit group, a target extension unit, and a host unit provided by an embodiment.

FIG. 7 is a schematic flow chart of a data transmission method provided by an embodiment.

FIG. 8 is a schematic flow chart of a data transmission method provided by an embodiment.

DETAILED DESCRIPTION OF THE EMBODIMENTS

Figure 3:
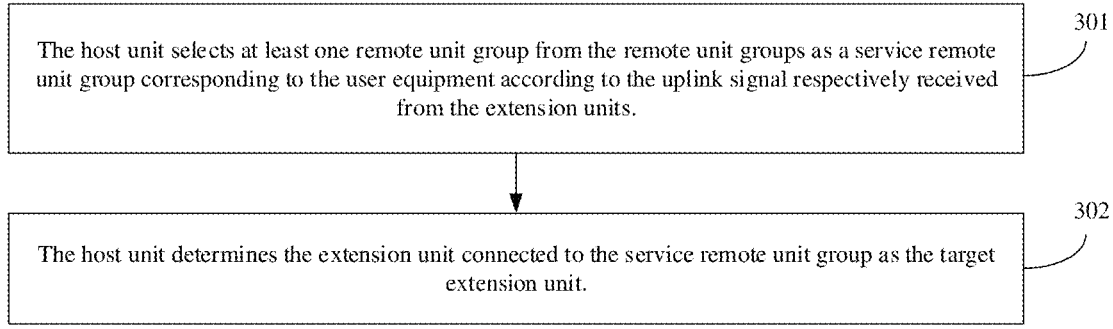
FIG. 3 is a schematic flow chart of a data transmission method provided by an embodiment.

Reference will be made to the accompanying drawings and embodiments to describe the present application in detail, so that the objects, technical solutions and advantages of the present application can be more apparent and understandable. It should be understood that the specific embodiments described herein are only used to explain the present disclosure and not intended to limit the present disclosure.

The data transmission method provided by the present application can be applied to a base station system as shown in FIG. 1, the base station system may include a plurality of network elements such as a host unit (AU), a plurality of extension units (CPs), and a plurality of remote units (DPs). The base station system may implement a connection between each of the network elements based on a topology manner shown in FIG. 1. The host unit is communicatively connected to the extension units, and each of the extension units is communicatively connected to at least one of the remote units. The extension units may be in a parallel relationship, such as the extension unit 1 and the extension unit 2, and may also be in a cascade relationship, such as the extension unit 1 and the extension unit 3. The remote units connected to one same extension unit may form one remote group (DP Group). Each extension unit may be connected to at least one of the remote unit groups (not limited to one remote unit group shown in FIG. 1), and for example the DP Group1 is connected to the extension unit 1. Each remote unit group may include a plurality of remote units, such as the DP Group1 includes the remote unit 11 to the remote unit 1K. The host unit mainly performs modulation and demodulation of the baseband signal, and the extension unit mainly performs forwarding and convergence of the uplink/downlink signal, and the remote unit mainly performs radio frequency reception/radio frequency transmission of the uplink/downlink signal. Generally, the host is communicatively connected to the core network, and the remote unit is communicatively connected to the user equipment. Therefore, the above base station system can implement communication between the host unit and the user equipment, communication between the core network and the user equipment, communication between the user equipment and the user equipment, and the like. The user equipment may be, but is not limited to, a device with a radio frequency receiving/transmitting function, such as a smart phone, a computer device, a portable wearable device, an Internet of Things device, a vehicle, an unmanned aerial vehicle, an industrial device, and the like.

In the base station system, the remote units are configured to be communicatively connected to one or more user equipment. To be described briefly, in the following embodiments, any user equipment accessing the base station system is taken as an example for description. However, it should be noted that the data transmission method of the present application may also be applied to a scenario in which a plurality of user equipment transmitting data simultaneously. For example, for each user equipment, by synchronously perform the steps in the data transmission method of the present application using multi-thread, the process of simultaneously transmitting data for a plurality of user equipment can be implemented.

The embodiments referring to the execution subject being the host unit side will be described in detail as follow. In an embodiment, as shown in FIG. 2, it is provided a data transmission method. Taking the method applied to the host unit in FIG. 1 as an example, the method includes the following steps.

At S201, the host unit determines a target extension unit corresponding to the user equipment from the extension units according to uplink signal respectively received from the extension units. The uplink signal sent by each extension unit is used to indicate a quality state of signaling between the remote unit connected to the extension unit and the user equipment.

The above uplink signal may be a preamble signal uploaded by a Physical Random Access Channel (PRACH), or a Sounding Reference Signal (SRS), or other signals which can represent the quality state of signaling between the remote unit and the user equipment. It can be understood that different user equipment and different remote units correspond to different uplink signals. Therefore, for a certain user equipment, the host unit may receive a plurality of uplink signals sent by all remote units through the extension units connected to the remote units.

For each extension unit, the host unit may store an identifier for each remote unit connected to the extension unit.

Exemplarily, the host unit may: receive SRS signal of the user equipment sent by the remote units from the extension units respectively; calculate signal quality parameters corresponding to the SRS signal; determine whether each extension unit meets a preset condition for each extension unit; and use at least one extension unit that meets the preset condition as the target extension unit. For example, the preset condition may be that the average signal quality parameter between each remote unit and the user equipment in the extension unit is greater than or equal to a preset signal quality parameter threshold. In conclusion, for any user equipment, the host unit of the present embodiment may select a signal transmission path (host unit-extension unit-remote unit-user equipment) with better signal quality from the extension units to implement a high quality signal transmission with the user equipment.

It should be noted that, for each user equipment, the host unit may determine the target extension unit corresponding to the user equipment, and may establish a correspondence between the user equipment and the target extension unit.

At S202, the host unit send instruction information to the target extension unit. The instruction information is used to instruct the target extension unit to send uplink data of the user equipment received from the remote unit to the host unit.

After the host unit has determined the target extension unit from the extension units, the communication between the host unit and the user equipment may be performed based on the target extension unit, such that communication with the user equipment based on other non-target extension units can be avoided. The host unit may send instruction information to the target extension unit, the instruction information may cause the target extension unit to know that the target extension unit is the target extension unit of certain user equipment, thereby indicating the target extension unit to send uplink data of the user equipment received from the remote unit to the host unit. The uplink data may be a uplink service data, such as a voice data, a video data, a webpage data, or the like, or may be a uplink control data.

It can be understood that the above instruction information may include uplink instruction information and downlink instruction information. The uplink instruction information corresponds to an uplink process, and the downlink instruction information corresponds to a downlink process.

At S203, the host unit receives the uplink data sent by the target extension unit.

It can be understood that, for a certain user equipment, each remote unit may receive uplink data sent by the user equipment. Each extension unit may receive the uplink data sent by each of the remote units connected to the extension unit. The target extension unit may sent the above uplink data to the host unit according to the received instruction information. The other non-target extension units does not receive the instruction information sent by the host unit, and does not perform the operation of sending the uplink data of the user equipment received from the remote unit to the host unit, therefore the data amount of the uplink data received by the host unit is strongly correlated with the number of remote units to which the target extension unit is connected.

Exemplarily, the uplink data may be a symbol data transmitted based on PUSCH (Physical Uplink Shared Channel).

Compared with that the amount of uplink data received by the host unit is strongly correlated with the number of all the remote units in the conventional technical solution, the amount of the uplink data received by the host unit of the present embodiment is only strongly correlated with the number of remote units connected to the target extension unit, that is, the transmitting amount of the uplink data is greatly reduced, thereby reducing the requirement for uplink front-haul bandwidth. Meanwhile, since the host unit further needs to process the uplink data, so that the embodiments further reduces the requirement for the processing capabilities (such as modulation and demodulation capabilities) of the host unit, thereby the cost of the host unit can be reduced comprehensively.

The above embodiment relates to an uplink process from the user equipment to the host unit. In another embodiment relating to a downlink process from the host unit to the user equipment, the downlink process includes the host unit sends downlink data to the target extension unit, and the downlink data is data to be sent by the host unit to the user equipment.

Specifically, the host unit may send the data to be sent to the user equipment (such as data sent down from the core network) to the target extension unit. The target extension unit may send the downlink data to at least one of the remote units connected to the target extension unit, such as one of the remote units, or a plurality of remote units, or all the remote units connected to the target extension unit. Further, each remote unit can send out the downlink data in the form of radio frequency signal and receive it by the user device. Therefore, the host unit only needs to send downlink data to the target extension unit. The downlink data may be a downlink service data, such as voice data, video data, webpage data, or the like, or may be downlink control data.

Compared with the traditional technical solution in which the host unit needs to send downlink data to all the extension units connected to the host unit, the host unit in the present embodiment only needs to send downlink data to the target extension unit, that is, the transmission data amount of the downlink data is greatly reduced, thereby reducing the requirement for downlink front-haul bandwidth, and can further reducing the cost of the host unit.

Referring to FIG. 3, in an embodiment, refers to a technical solution in which a plurality of remote units connected to one same extension unit are divided into remote unit groups. Specifically, the remote units are divided into a plurality of remote unit groups, each extension unit is communicatively connected to at least one of the remote unit groups. The uplink signal sent by each extension unit is used to indicate a quality state of signaling between each remote unit group connected to the extension unit and the user equipment. The above step S201 may include the following steps.

At S301, the host unit selects at least one remote unit group from the remote unit groups as a service remote unit group corresponding to the user equipment according to the uplink signal respectively received from the extension units.

The division of the remote unit groups is predetermined. For each extension unit, the host unit may store identifiers of the remote unit groups connected to the extension unit, or may store identifiers of remote units in the remote unit group for each remote unit group. Similarly, in the extension unit, identifiers of remote units in the remote unit group may also be stored for each remote unit group connected to the extension unit, or the above divided data sent by the host unit is received, for example, the remote unit group 2 includes the remote unit 21 to the remote unit 2L. Optionally, the remote units belonging to one same remote unit group may have a correlation in a spatial position, for example, distances between each other are less than a preset distance threshold, or are positioned within an area having a certain preset size.

For a certain user equipment, each remote unit may receive an uplink signal sent by the user equipment. The extension unit may receive the uplink signal sent by each remote unit connected to the extension unit, and performs radio frequency combining processing on each of the remote unit groups belonging to one same remote unit group to obtain radio frequency combining processed uplink signal of each of the remote unit groups, the uplink signal may indicate a quality state of signaling between each remote unit group connected to the extension unit and the user equipment.

For any user equipment, the host unit in this embodiment may receive uplink signal sent by all remote unit groups through each extension unit, and select one remote signal group with better signal quality from all remote unit groups as a service remote unit group, so as to achieve high quality signal transmission with the user equipment.

At S302, the host unit determines the extension unit connected to the service remote unit group as the target extension unit.

The host unit may determine an extension unit connected to the service remote unit group as the target extension unit according to the pre-stored connection relationship between each remote unit group and each extension unit.

It can be understood that, in the uplink process, the extension unit may receive uplink data uploaded by each remote unit connected to the extension unit, and performs a radio frequency combining process (equivalent to a kind of signal superimposition process) on the uplink signal belonging to one same remote unit group, to obtain a plurality of radio frequency combining processed uplink data, and each radio frequency combining processed uplink data is in one-to-one correspondence with each remote unit group.

Exemplarily, the host unit connects to M remote units through L extension units, the N remote units form a remote unit group, and the base station system has a total of K=[M/N] remote unit groups. Illustratively, if the number of remote unit groups to which each extension unit is connected is the same, the number of remote unit groups to which the target extension unit is connected is J=[M/N/L].

Compared with that the amount of uplink data received by the host unit is only strongly correlated with the number (such as M/L) of the remote units connected to the target extension unit in the above embodiments, the amount of the uplink data received by the host unit of the present embodiment is only strongly correlated with the number (such as M/N/L) of remote unit groups connected to the target extension unit, that is, the transmitting amount of the uplink data is further reduced, thereby the requirement for uplink front-haul bandwidth is further reduced.

If the host unit communicates with the user equipment through L extension units, the data amount of the uplink data received by the host unit is strongly correlated with the number K of all remote unit groups during the uplink process. However, when the radio frequency combining is performed, a rising of the floor noise will be caused. Therefore, the maximum number N of radio frequency combining of the remote units is limited. Generally, only 4 or 8 remote units are allowed to perform radio frequency combining, therefore the number K of the remote unit groups cannot get smaller indefinitely. Therefore, there is a limitation in reducing the uplink front-haul bandwidth only based on the radio frequency combining of the remote unit groups, however, this embodiment breaks through this limitation and further reduces the uplink front-haul bandwidth.

It should be noted that, for each user equipment, the host unit may determine a service remote unit group of the user equipment, and may establish a correspondence between the user equipment and the service remote unit group.

In an embodiment, the instruction information may include an identifier of the service remote unit group. The identifier of the present application is not limited thereto, and may be formed by numbers, letters, or a combination thereof, so that the target extension unit can be quickly and efficiently positioned to the accurate service remote unit group.

The host unit may send the above identifier of the service remote unit group to the target extension unit, and the target extension unit may determine the service remote unit group based on the identifier. It may be understood that in the uplink process, the target extension unit may only send the uplink data sent by the service remote unit group to the host unit, and the host unit will only receive one way of uplink data corresponding to the service remote unit group, which further reduces the transmission data amount of the uplink data, and further reduces the requirements for the uplink front-haul bandwidth.

It should be noted that, for the uplink process, the host unit generally sends uplink scheduling information for the user terminal to the target extension unit, and the uplink scheduling information may include an uplink time-frequency resource position allocated to the user equipment, which is used to instruct the target extension unit to send the uplink time-frequency resource position to the user equipment through all the remote units connected to the target extension unit, or the remote units in the remote unit group connected to the target extension unit, or other remote unit, and parses the uplink data sent by the user equipment from the uplink data sent by each remote unit group according to the uplink time-frequency resource.

For the downlink process, the host unit generally sends downlink scheduling information for the user terminal to the target extension unit, and the downlink scheduling information may include a downlink time-frequency resource position allocated to the user equipment, which is used to instruct the target extension unit to send the downlink time-frequency resource position and the downlink data for the user equipment to the user equipment through all the remote units connected to the target extension unit, or the remote units in the service remote unit group connected to the target extension unit, or other remote units.

In addition, in the above downlink or uplink process, the above instruction information may include an identifier allocated to the user equipment to notify the target extension unit, which is equivalent to establishing a correspondence between the user equipment and the target extension unit, and the correctness and efficiency of data transmission during uplink and downlink data transmission. For example, the identifier of the user equipment may be a Cell Radio Network Temporary Identify (C-RNTI), etc. In practical application, the identifier may be allocated according to the situation, and this embodiment is not limited thereto.

Figure 4:
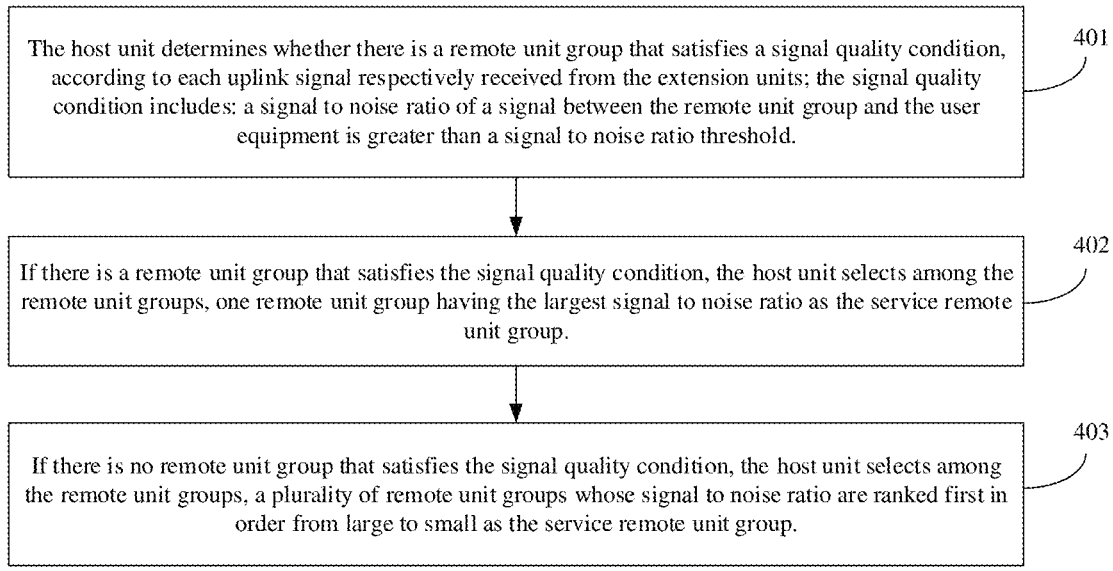
FIG. 4 is a schematic flow chart of a data transmission method provided by an embodiment.

Referring to FIG. 4, in an embodiment, it involves the process that the host unit selects a remote unit group. Specifically, S301 may include the following steps.

At S401, the host unit determines whether there is a remote unit group that satisfies a signal quality condition, according to each uplink signal respectively received from the extension units. The signal quality condition includes: a signal to noise ratio of a signal between the remote unit group and the user equipment is greater than a signal to noise ratio threshold.

The Signal to Noise Ratio (SNR, or S/N) represents the ratio of signal to noise. The higher the signal to noise ratio is, the better the signal quality is. The host unit may calculate the signal to noise ratio associated with each uplink signal according to each uplink signal, that is, the signal to noise ratio of the signal between the remote unit group and the user equipment corresponding to the uplink signal. The signal to noise ratio threshold may be a minimum signal to noise ratio acceptable to the base station system, may be preset, or may be set. It should be noted that the signal to noise ratio of the signal between the remote unit group and the user equipment is the signal to noise ratio associated with the radio frequency combining processed uplink signal corresponding to the remote unit group. Certainly, it is not limited to the above solutions, and it may also be a statistical value of each sound to noise ratio associated with each uplink signal sent by each remote unit corresponding to the remote unit group, such as an average value, a median value, etc. In conclusion, this embodiment is not limited thereto.

S402, if there is a remote unit group that satisfies the signal quality condition, the host unit selects among the remote unit groups, one remote unit group having the largest signal to noise ratio as the service remote unit group.

The host unit can track and locate the remote unit groups connected to the user equipment through the PRACH or SRS measurement.

Exemplarily, the host unit can obtain signal to noise ratios associated with remote unit group 1 to remote unit group K, which are respectively S1, S2, ..., SK. If Si is the largest and Si is greater than the signal to noise ratio threshold, the remote unit group i is regarded as a service remote unit group. That is, when there is a remote unit group that meets the requirements of the communication signal quality with the user equipment, generally, the user equipment is positioned in a central area of the signal cover region of the remote unit group i, and the remote unit group with the best communication signal quality may be selected as the service remote unit group to improve the communication quality.

S403, if there is no remote unit group that satisfies the signal quality condition, the host unit selects among the remote unit groups, a plurality of remote unit groups whose signal to noise ratio are ranked first in order from large to small as the service remote unit group.

Referring to the above example, if Si is the largest and Si is less than or equal to the signal to noise ratio threshold, then S1, S2, ..., SK are arranged from large to small, and the remote unit groups ranked first (the value of the higher the signal to noise ratio is higher) are selected as the service remote unit group. That is, when there is no remote unit group that meets the requirements of the communication signal quality with the user equipment, generally, the user equipment is positioned in a fringe area of the signal cover region of at least one remote unit group, and a plurality of remote unit groups with best communication signal qualities may be selected as the service remote unit groups to improve the communication quality as much as possible.

Exemplarily, the AU obtains K sets of PRACH or SRS measurement data, and each set of measurement data corresponds to a different DP group respectively, and the AU selects a DP Group with the best signal quality as a first service DP Group of the UE according to the signal qualities of the K sets of data. Optionally, the AU selects two groups of DP Groups with the best signal qualities according to the signal qualities of the K groups of data, respectively, as a first service DP Group and a second service DP Group of the UE.

Figure 5:
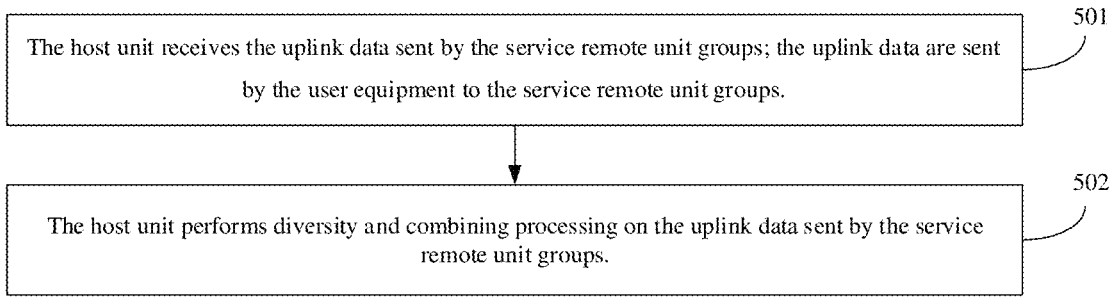
FIG. 5 is a schematic flow chart of a data transmission method provided by an embodiment.

As shown in FIG. 5, in an embodiment, when the number of the service remote unit groups is more than one, a process that the host unit performs diversity and combining processing on the uplink data sent by the service remote unit groups is involved. Specifically, the above S203 may include the following steps.

At S501, the host unit receives the uplink data sent by the service remote unit groups. The uplink data are sent by the user equipment to the service remote unit groups.

The service remote unit groups may be connected to one same target extension unit, or may be connected to different target extension units.

The cascading relationship between each extension unit may also be stored in the host unit. Therefore, if the service remote unit groups are connected to the extension units, and if there is no cascading relationship between the extension units, the host unit may regard all the above extension units as target extension units. If there is a cascading relationship between the above extension units, the host unit may select an extension unit closer to the host unit among the extension units having a cascading relationship (For example, according to the topological relationship, or an extension unit on one side of the host unit) as the target extension unit. Correspondingly, the instruction information sent by the host unit to the target extension unit may include the identifier of the subordinate extension unit connected to the target extension unit, and the identifier of the remote unit group connected to the subordinate extension unit, and so on, and the lower extension unit is connected to at least one service remote unit group.

In addition, if the target extension unit is not directly connected to the host unit, but is connected to the host unit through the superordinate extension unit cascaded with the target extension unit, the host unit may communicate with the target extension unit through the superordinate extension unit. Specifically, the host unit may send forwarding instruction information to the superordinate extension unit, the forwarding instruction information may include an identifier of the target extension unit, which is used to indicate the superordinate extension unit to forward the data sent by the host unit to the superordinate extension unit to the target extension unit. In conclusion, actually there are many scenarios in which the present embodiment or the variation of the present embodiment may be adopted, and this embodiment is not limited thereto.

Exemplarily, when the service remote unit groups are a first service DP Group and a second service DP Group, the target extension unit may send two ways of uplink data respectively sent by the first service DP Group and the second service DP Group to the host unit respectively.

At S502, the host unit performs diversity and combining processing on the uplink data sent by the service remote unit groups.

The host unit may receive two ways of uplink data sent by the first service DP Group and the second service DP Group through the target extension unit respectively, and may perform diversity reception and combining processing on the two ways of uplink data. For the user equipment positioned in the fringe areas of the signal cover regions of the first service DP Group and the second service DP Group, the signal to noise ratio of the uplink data received by the host unit from the user equipment can be improved.

Referring to FIG. 6, is a schematic diagram of DP group selections when the user equipment is positioned at different positions provided by this embodiment. According to the topology structure shown in FIG. 1, there are four scenarios for the position of the user equipment as below.

1) The UE1 is positioned at the center position of one DP Group1.

2) The UE2 is positioned between the DP Group1 and the DP Group2, and the two DP Groups are up-cascaded to one same CP (CP1).

3) The UE3 is positioned between the DP Group2 and the DP Group3, and the two DP groups are up-cascaded to different CPs, and the CPs (CP1 and CP2) are in a cascading relationship.

4) The UE4 is positioned between the DP Group3 and the DP Group4, and the two DP Groups are up-cascaded to different CPs, and the CPs (CP1 and CP3) are in a non-cascading relationship.

Correspondingly, the first service DP Group and the second service DP Group of each UE and the uplink front-haul path are shown as the following table.

| | Comparative Item | | |
|---|---|---|---|
| User Equipment | First Service DP Group | Second Service DP Group | Uplink Front-haul Path |
| UE1 | DP Group1 | | DP Group1->CP1->AU |
| UE2 | DP Group1 | DP Group2 | DP Group1->CP1->AU DP Group2->CP1->AU |
| UE3 | DP Group2 | DP Group3 | DP Group2->CP1->AU DP Group3->CP2->CP1->AU |
| UE4 | DP Group3 | DP Group4 | DP Group4->CP3->AU DP Group3->CP2->CP1->AU |

For example, for the above first scenario, for the UE1, the host unit determines that the UE1 is positioned at the center position of the DP Group1, that is, the service remote unit group is the DP Group1, and then determines that the target extension unit is the CP1 connected to the DP Group1. In the uplink process, the target extension unit CP1 may receive one way of uplink data of the UE1 sent by the service remote unit group DP Group1, and only send the one way of uplink data of the UE1 sent by the service remote unit group DP Group1 to the host unit. In the downlink process, the host unit may send the downlink data for the UE1 to the target extension unit CP1, and send the identifier of the DP Group1 to the CP1. The CP1 may send the downlink data for the UE1 to the DP Group1.

For example, for the second scenario, for the UE2, the host unit determines that the UE2 is positioned between the DP Group1 and the DP Group2, that is, the DP Group1 and the DP Group2 are both service remote unit groups, and then determines that the target extension unit is the CP1 connected to the DP Group1 and the CP2 connected to the DP Group2. In the uplink process, the target extension unit CP1 may receive one way of uplink data of the UE2 sent by the service remote unit group DP Group1, and only send one way of uplink data of the UE2 sent by the service remote unit group DP Group1 to the host unit. The target extension unit CP2 may receive one way of uplink data of the UE2 sent by the service remote unit group DP Group2, and only send one way of uplink data of the UE2 sent by the service remote unit group DP Group2 to the host unit. The host unit may receive one way of uplink data of the UE2 sent by the service remote unit group DP Group1 from the target extension unit CP1, and receives one way of uplink data of the UE2 sent by the service remote unit group DP Group2 from the target extension unit CP2, and performs diversity and combining processing on the two ways of uplink data to improve the received signal to noise ratio of UE2. In the downlink process, the host unit may send the two ways of downlink data for the UE2 to the target extension units CP1 and CP2 respectively, and send the identifier of the DP Group1 to the CP1, and send the identifier of the DP Group2 to the CP2. The CP1 may send the downlink data for the UE2 to the DP Group1, and the CP2 may send the downlink data for the UE2 to the DP Group2.

Optionally, the service remote unit group includes a first service remote unit group and a second service remote unit group. The first service remote unit group is communicatively connected to the first extension unit of the extension units, the second service remote unit group is communicatively connected to a second extension unit of the extension units. The first extension unit is communicatively connected to the host unit, the second extension unit is communicatively connected to the first extension unit. The target extension unit includes the first extension unit.

For example, for the above third scenario, for the UE3, the host unit determines that the UE3 is positioned between the DP Group2 and the DP Group3, that is, the DP Group2 and the DP Group3 are both service remote unit groups, and the CP1 connected to the DP Group2 is cascaded with the CP2 connected to the DP Group3, the CP1 is the superordinate extension unit of the CP2, and then determines that the target extension unit is CP1. In the uplink process, the extension unit CP2 may receive the uplink data of the UE3 sent by the service remote unit group DP Group3, and send the uplink data of the UE3 to the superordinate extension unit CP1 of the CP2. The target extension unit CP1 may receive the uplink data of the UE3 sent by the service remote unit group DP Group2 and the uplink data of the corresponding service remote unit group DP Group3 sent by the subordinate extension unit CP2 of the CP1, and send the uplink data of both two ways of UE3s of the service remote unit group DP Group2 and the service remote unit group DP Group3 to the host unit, and performs diversity and combining processing on the two ways of uplink data to improve the received signal to noise ratio of UE3. Similarly, in the downlink process, the host unit may send the downlink data for the UE3 to the target extension unit CP1, and send the identifier of the DP Group2, the identifier of the CP2, and the identifier of the DP Group3 connected to the CP2 to the CP1. The CP1 may send the downlink data for the UE3 to the DP Group2, and send the downlink data for the UE3 and the identifier of the DP Group3 to the CP2. The CP2 sends the downlink data for the UE3 to the DP Group3.

For example, for the above fourth scenario, for the UE4, the host unit determines that the UE4 is positioned between the DP Group3 and the DP Group4, that is, the DP Group3 and the DP Group4 are both service remote unit groups, and the CP2 connected to the DP Group3 is not cascaded with the CP3 connected to the DP Group4, but the CP1 is the superordinate extension unit of the CP2, and the CP3 does not have a superordinate extension unit, and then determines that the target extension unit is CP1 and CP3. In the uplink process, the extension unit CP2 may receive the uplink data of the UE4 sent by the service remote unit group DP Group3, and send it to the superordinate extension unit CP1 of the CP2. The target extension unit CP1 may receive the uplink data of the corresponding service remote unit group DP Group3 sent by the subordinate extension unit CP2 of the CP1, and send it to the host unit. The target extension unit CP3 may receive the uplink data of the UE4 sent by the service remote unit group DP Group4, and send it to the host unit. The host unit may receive one way of uplink data of the UE4 sent by the service remote unit group DP Group3 from the target extension unit CP1, and receives one way of uplink data of the UE4 sent by the service remote unit group DP Group4 from the target extension unit CP3, and performs diversity and combining processing on the two ways of uplink data to improve the received signal to noise ratio of UE4. Similarly, in the downlink process, the host unit may send the two ways of downlink data for the UE4 to the target extension unit CP1 and the target extension unit CP3 respectively, and send the identifier of the CP2, the identifier of the DP Group3 connected to the CP2 to the CP1, and send the identifier of the DP Group4 connected to the CP3 to the CP3. The CP1 may send the downlink data for the UE3 and the identifier of the DP Group3 to the CP2. The CP2 sends the downlink data for the UE3 to the DP Group3. The CP3 sends the downlink data for the UE4 to the DP Group4.

Optionally, the host unit and the extension unit may be connected through enhanced Common Public Radio Interface (eCPRI) for data packet transmission. The requirement for the transmission bandwidth is greatly reduced. Correspondingly, the extension unit and the remote unit can be connected through CPRI interface (Common Public Radio Interface) for IQ data stream (orthogonal signal) transmission. The design complexity and the cost of the remote unit can be effectively reduced.

The following is a detailed description of an embodiment in which the execution subject is the extension unit (particularly the target extension unit) side. It should be noted that, since there are repetitive nouns, steps or beneficial effects between the embodiments of the extension unit side and the embodiments of the host unit side, then for these repetitive parts, which have already been described in the embodiments of the host unit side, will not be described again in the embodiments of the extension unit side.

In an embodiment, as shown in FIG. 7, it is provided a data transmission method. Taking the method applied to the extension unit in FIG. 1 as an example, the method may include the following steps.

At S701, the target extension unit of the extension units corresponding to the user equipment receives instruction information from the host unit. The target extension unit is determined by the host unit according to uplink signal respectively received from the extension units, the uplink signal is used to indicate a quality state of signaling between the remote unit connected to the extension unit and the user equipment. The instruction information is used to instruct the target extension unit to send the uplink data of the user equipment received from the remote unit to the host unit.

The above uplink signal may be a preamble signal uploaded by a Physical Random Access Channel (PRACH), or a Sounding Reference Signal (SRS), or other signals which can represent the quality state of signaling between the remote unit and the user equipment.

It can be understood that, for each extension unit, each extension unit may determine whether the instruction information sent by the host unit is received within a preset time period. If the instruction information is received, the extension unit is the target extension unit, and it may execute the step of S702. If the instruction information is not received, the extension unit is not the target extension unit, and it continues to wait.

At S702, the target extension unit sends the uplink data of the user equipment among the received uplink data to the host unit according to the instruction information, after receiving the uplink data sent by the remote unit.

It can be understood that the target extension unit is connected to the remote units, and the remote units may receive uplink data sent by a plurality of equipment (including the user equipment corresponding to the target extension unit). The above instruction information may include at least one of the following content: an uplink video resource position allocated to the user equipment, an identifier of the user equipment, and so on. In general, the target extension unit may select uplink data of the user equipment corresponding to the target extension unit from the received uplink data according to the instruction information, and send it to the host unit.

Compared with that the amount of uplink data received by the host unit is strongly correlated with the number of all the remote units in the conventional technical solution, the amount of the uplink data received by the host unit of the present embodiment is only strongly correlated with the number of remote units connected to the target extension unit, that is, the transmitting amount of the uplink data is greatly reduced, thereby reducing the requirement for uplink front-haul bandwidth. Meanwhile, since the host unit further needs to process the uplink data, so that the embodiments further reduces the requirement for the processing capabilities (such as modulation and demodulation capabilities) of the host unit, thereby the cost of the host unit can be reduced comprehensively.

The above embodiment relates to an uplink process from the user equipment to the host unit. While in an embodiment, referring to FIG. 8, relates to an downlink process from the host unit to the user equipment, specifically, the downlink process includes:

At S801, the target extension unit receives downlink data from the host unit. The downlink data is data to be sent by the host unit to the user equipment.

Referring to the above description, descriptions thereof will not be repeated here.

At S802, the target extension unit sends the downlink data to the user equipment through a remote unit connected to the target extension unit according to the instruction information.

In an implementation, the target extension unit may send the downlink data to all the remote units connected to the target extension unit. After receiving the downlink data, each remote unit sends the downlink data in the form of radio frequency signal, and the downlink data is received by the user equipment.

Compared with the traditional technical solution in which the host unit needs to send downlink data to all the extension units connected to the host unit, the host unit in the present embodiment only needs to send downlink data to the target extension unit, that is, the transmission data amount of the downlink data is greatly reduced, thereby reducing the requirement for downlink front-haul bandwidth, and can further reducing the cost of the host unit.

Optionally, the remote units are divided into a plurality of remote unit groups, each of the extension units is communicatively connected to at least one of the remote unit groups. The target extension unit is communicatively connected to the service remote unit group corresponding to the user equipment. The service remote unit group is determined by the host unit according to uplink signal respectively received from the extension units, the uplink signal sent by one of the extension units is used to indicate a quality state of signaling between each remote unit group connected to the extension unit and the user equipment.

It can be understood that, in the uplink process, the target extension unit will perform radio frequency combining processing on the signal sent by each of the remote units in one same remote unit group to obtain a radio combining processed signal, to reduce the uplink front-haul bandwidth.

In an embodiment, the instruction information may include an identifier of the service remote unit group. For the description and determination process of the service remote unit group, reference may be made to the description of the above host unit side, and description thereof will not be repeated here.

Accordingly, it can be understood that, for the uplink process, the above S702 may include: the target extension unit parses the uplink data of the user equipment from the uplink data sent by the service remote unit group according to the identifier of the service remote unit group and a time-frequency resource position corresponding to uplink scheduling information of the user equipment, and sends the uplink data of the user equipment to the host unit.

It can be understood that, for the uplink process, the host unit generally sends uplink scheduling information for the user terminal to the target extension unit, and the uplink scheduling information may include an uplink time-frequency resource position allocated to the user equipment. The target extension unit may send the uplink time-frequency resource position to the user equipment through all the remote units connected to the target extension unit, or the remote units in the service remote unit group connected to the target extension unit, or other remote units. Different devices may send uplink data to the remote unit on different video resource positions, and each remote unit may send the uplink data to the target extension unit, and the target extension unit may receive it and perform radio frequency combining on the uplink data belonging to one remote unit group, and selects the radio frequency combined uplink data of the remote unit group for the user equipment, and parses the uplink data of the user equipment according to the uplink time-frequency resource position of the user equipment, and then sends it to the host unit.

Specifically, parses the uplink data of the user equipment from the uplink data sent by the service remote unit group may include: the target extension unit performs low physical layer (PHY-L) processing on radio frequency signal sent by the service remote unit group according to the time-frequency resource position corresponding to the uplink scheduling information of the user equipment, and obtaining PHY-L processed symbol data. The radio frequency signal carries the uplink data. The PHY-L processing may include: FFT (Fast Fourier Transformation), RE (Resource Element) demapping, and the like.

Compared with that the amount of uplink data received by the host unit is only strongly correlated with the number of the remote units connected to the target extension unit in the above embodiments, the amount of the uplink data received by the host unit of the present embodiment is only strongly correlated with the number of remote unit groups connected to the target extension unit, that is, the transmitting amount of the uplink data is further reduced, thereby the requirement for uplink front-haul bandwidth is further reduced.

Accordingly, it may be understood that, for the downlink process, the above S802 may include: the target extension unit sends the downlink data to the user equipment through a remote unit connected to the target extension unit according to the instruction information, includes: the target extension unit sends the downlink data to the user equipment through the service remote unit group on a time-frequency resource position corresponding to downlink scheduling information of the user equipment according to the identifier of the service remote unit group.

For the downlink process, the host unit generally sends downlink scheduling information for the user terminal to the target extension unit, and the downlink scheduling information may include a downlink time-frequency resource position allocated to the user equipment. The target extension unit may send the downlink time-frequency resource position to the user equipment through all the remote units connected to the target extension unit, or the remote units in the service remote unit group connected to the target extension unit, or other remote units. The target extension unit may also send the downlink data to the user equipment through the same path. It can be understood that, the target extension unit may send the downlink data only to the remote units corresponding to the service remote unit group, and not to other remote units, thereby reducing the bandwidth requirement between the extension unit and the remote unit, and further to reduce the cost.

Specifically, the target extension unit sends the downlink data to the user equipment through the service remote unit group on a time-frequency resource position corresponding to downlink scheduling information of the user equipment according to the identifier of the service remote unit group, includes: the target extension unit performs low-physical layer processing on the symbol data sent by the host unit to obtain a PHY-L processed radio frequency signal according to the time-frequency resource position corresponding to the downlink scheduling information of the user equipment. The symbol data carries the downlink data. The target extension unit sends the PHY-L processed radio frequency signal to the service remote unit group. The PHY-L processing may include: IFFT (Inverse Fast Fourier Transform), RE mapping, and the like.

Figure 9:
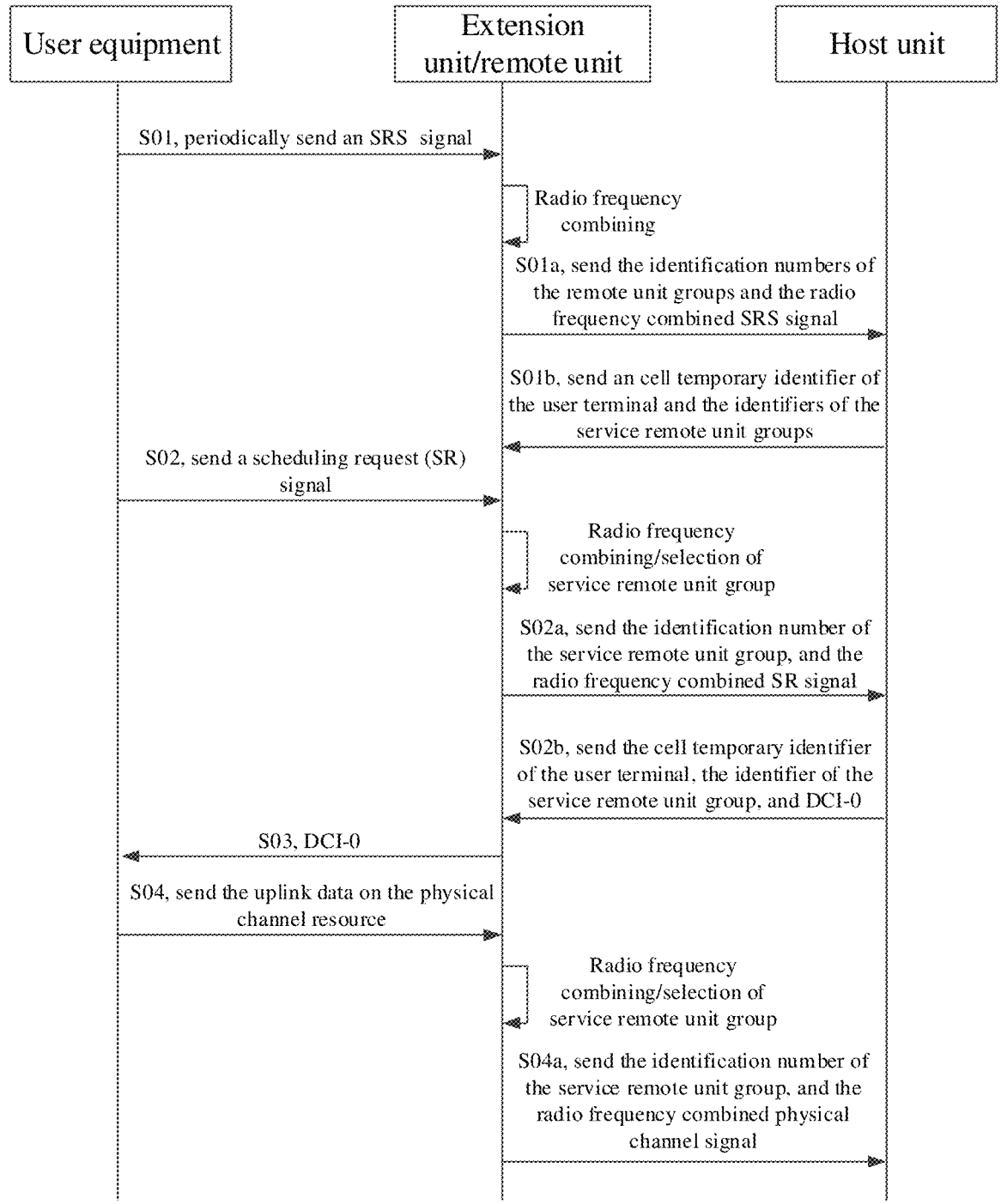
FIG. 9 is an schematic interaction diagram illustrating a data transmission method provided by an embodiment.

As shown in FIG. 9, from another perspective, a process of data transmitting of the present application is illustrated, including the followings steps.

At S01, the user equipment periodically sends an SRS (Sounding Reference Signal) signal.

Specifically, the remote unit receives a SRS RF signal and then sends it to the extension unit, and the extension unit performs a radio frequency combining on the received SRS radio frequency signal of one same remote unit group, the number of the radio frequency combining is configured through an Operation Administration and Maintenance (OAM) subsystem. The extension unit performs a PHY-L processing on the radio frequency combined SRS radio frequency signal, including FFT and RE demapping, to obtain a SRS symbol data.

At S01a, the extension unit sends the SRS symbol data to the host unit, while carries the identifiers of the radio frequency combined remote unit groups.

At S01b, after receiving the SRS symbol data of the remote unit groups, the host unit performs PHY-H processing, such as channel estimation, equalization, descrambling, decoding, etc., to obtain SRS bit data. At the same time, the host unit selects one group with the largest SRS signal to noise ratio value as the first service remote unit group of the user equipment by demodulating the SRS symbols of the remote unit groups.

Optionally, if the SRS signal to noise ratio of the user equipment is lower than a certain threshold, the host unit selects two sets of remote unit groups with the best signal qualities as a first service remote unit group and a second service remote unit group of the user equipment respectively. The host unit sends an intra-cell temporary identifier and the identifiers of the first and second service remote unit groups of the user equipment to the corresponding extension unit.

At S02, the user equipment sends a scheduling request (SR), requesting the network to allocate an uplink resource.

Specifically, this step is the same as the SOL that the extension unit receives the SR, and the scheduling request signal is carried by the PUCCH (Physical Uplink Control Channel), and a radio frequency combining is performed on the radio frequency signal, the number of the radio frequency combining is configured through the OAM subsystem. The extension unit performs PHY-L processing (including FFT and RE demapping) on the radio frequency combined SR radio frequency signal, to obtain a SR symbol data.

At S02a, the extension unit sends the SR symbol data to the host unit, while carries the identifier of the radio frequency combined remote unit group.

At S02b, after receiving the SR symbol data, the host unit performs PHY-H processing, and then notifies the Media Access Control Address (MAC) subsystem to perform an uplink resource allocation. The host unit sends the intra-cell temporary identifier of the user equipment, the identifier of the service remote unit group, and the DCI (Downlink Control Information)-0 to the corresponding extension unit (target extension unit), the DCI-0 includes the uplink resource allocation result of the user equipment, such as the time-frequency resource position information of the Physical Uplink Shared Channel (PUSCH).

At S03, the extension unit directly transmits the DCI-0 down to the user equipment.

At S04, the user equipment sends the uplink data on the PUSCH resource specified by DCI-0.

Specifically, the extension unit performs a radio frequency combining after receiving the PUSCH radio frequency signal, the number of the radio frequency combining is configured through the OAM subsystem. The extension unit performs PHY-L processing (including FFT and RE demapping) on the radio frequency combined PUSCH radio frequency signal, to obtain a PUSCH symbol data.

At S04a, the extension unit (target extension unit) sends the PUSCH symbol data to the host unit, while carries the identifier of the radio frequency combined service remote unit group.

Specifically, the extension unit only needs to send the uplink data received on the corresponding service remote unit group and the corresponding PUSCH time-frequency position according to the service remote unit group of the user equipment sent down by the host unit in step S01b and the PUSCH time-frequency position information specified by DCI-0. In this step, the host unit may determine that the user equipment is positioned at the overlap of the two service remote unit groups, at this time, the host unit sends down the identifiers of the two service remote unit groups to the target extension unit, and the target extension unit performs a PHY-L processing on the uplink data received by the two ways of service DP Groups and then uploads them to the host unit respectively. Since the user equipment may move at the overlap of the different service DP groups, the target extension unit sends the PUSCH symbol data corresponding to the two ways of service DP groups to the host unit, which can be used for the host unit to perform diversity reception, and improve the receiving gain of the edge user. After receiving the PUSCH symbol data, the host unit performs PHY-H processing, such as channel estimation, equalization, descrambling, decoding, etc., and finally obtains PUSCH bit data and transmits it to the MAC. In this step, if the host unit receives two ways of symbol data of one same piece of PUSCH time-frequency resource (corresponding to the first service DP Group and the second service DP Group of the UE respectively), the manner of diversity and combining is adopted in the channel equalization process to improve the SNR of the uplink reception.

In the above process, the host unit implements real-time location on the remote unit group to which the user equipment belongs by demodulating the uplink SRS signal of the user equipment, and sends the service remote unit group identifier of the user equipment to the corresponding extension unit (target extension unit). After receiving the uplink symbol data of the corresponding user equipment, the extension unit only needs to upload one way or two ways of signal(s) of service remote unit group of the user equipment to the host unit, thereby reducing the requirement of the uplink bandwidth for the front-haul transmission. At the same time, the host unit may also only send the downlink data of the user equipment to the remote unit group to which the user equipment belongs according to the remote unit group to which the user equipment belongs, thereby reducing the front-haul downlink bandwidth requirement.

In addition, the present invention sinks part of the PHY function (PHY-L, including the bottom physical layer function including the antenna resource mapping of the user equipment) down to be implemented in the extension unit, and the extension unit has a part of the physical layer processing capability, which can further reduce the front-haul bandwidth.

It should be understood that although the various steps in the flowchart of FIGS. 2-5, 7-9 are sequentially displayed as indicated by the arrows, these steps are not necessarily performed in the order indicated by the arrows. Unless explicitly stated herein, the performing order of the steps is not be limited strictly, and the steps may be performed in other orders. Moreover, at least part of the steps in FIGS. 2-5, 7-9 may comprise a plurality of sub-steps or phases, which are not necessary to be performed simultaneously, but may be performed at different times, and for the performing order thereof, it is not necessary to be performed sequentially, but may be performed by turns or alternately with other steps or sub-steps of other steps or at least part of the phases.

Figure 10:
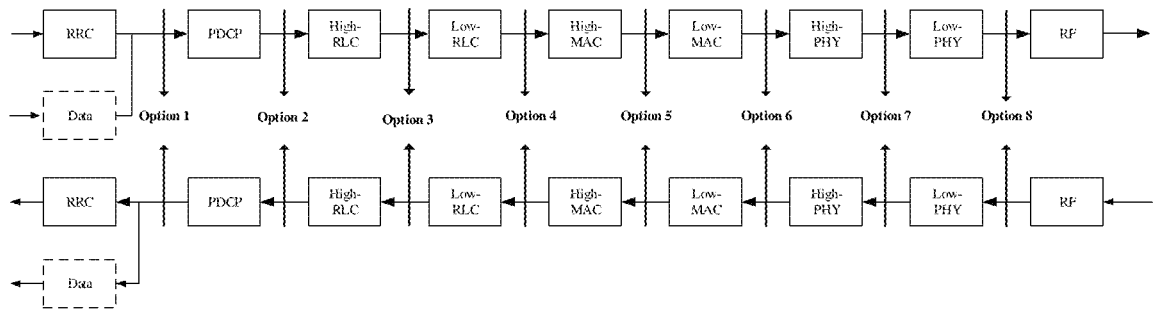
FIG. 10 is a schematic diagram illustrating a BBU-RRU function partition provided by the 3GPP protocol.

In the present embodiment, please refer to the schematic diagram of a BBU-RRU function partition provided by the 3GPP protocol shown in FIG. 10, the host unit is responsible for implementing the functions of all layers before option 7, and the extension unit is responsible for implementing the PHY-L function between option 7 and option 8, and the remote unit is responsible for the radio frequency (RF) signal transceiving function after option 8, and the layers are partitioned in functions.

Figure 11:
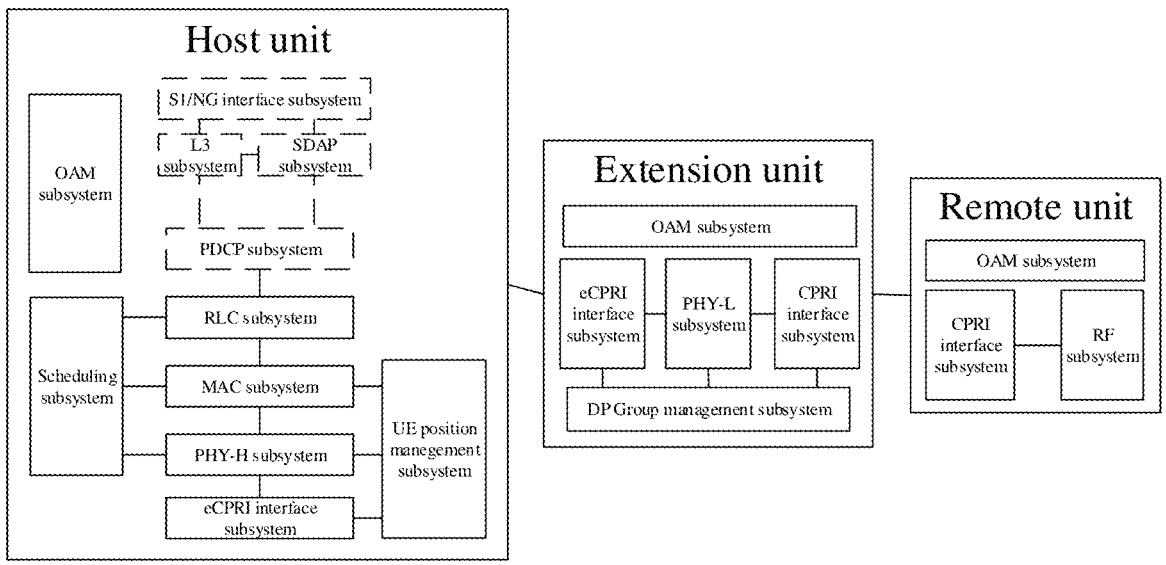
FIG. 11 is a schematic diagram illustrating each function subsystem in a base station system provided by an embodiment.

As shown in FIG. 11, the host unit (AU) includes a UE position management subsystem, an eCPRI interface subsystem, an OAM (Operation Administration and Maintenance) subsystem, and a 3GPP defined RAN (Radio Access Network) protocol stack subsystem. The UE position management subsystem implements the location function of the UE, and performs DP-level or DP-group level location on the UE based on data processing of the PHY-H (High-PHY, High-Physical Layer) subsystem. The eCPRI interface subsystem implements parsing and encapsulation of the eCPRI protocol packets, and performs data transmission with the extension unit based on the eCPRI packets. The OAM subsystem implements the functions of software management, configuration management, fault management, and performance management. The RAN protocol stack subsystem includes: PHY-H subsystem, MAC (Media Access Control) layer subsystem, RLC layer subsystem, PDCP (Packet Data Convergence Protocol) subsystem, SDAP (Service Data Adaptation Protocol) subsystem, scheduler subsystem, L3 (Layer 3) subsystem, SUNG interface subsystem. The physical layer subsystem, the MAC layer subsystem, and the RLC (Radio Link Control Protocol) subsystem implement a data processing that the RAN system and the transmission time interval (TTI) timing are strictly related. The PDCP layer subsystem implements the functions of data integrity protection, air interface encryption, and IP Header Compression. The scheduling subsystem implements management and scheduling of air interface resources. The L3 subsystem implements RRC protocol signaling processing and implements LTE system radio resource management. The SDAP subsystem implements mapping of different IP flows to radio bearers. The SUNG interface subsystem implements core network S1-MME/NG-AMF control signaling processing and GTP-U tunnel data processing. Detailed definitions can refer to the 3GPP protocol. Illustratively, the host unit may be implemented by a server and an FPGA (Field-Programmable Gate Array) or the like.

As shown in FIG. 11, the extension unit (CP) includes a DP Group management subsystem, an eCPRI interface subsystem, a PHY-L (Low-PHY, Low-Physical Layer) subsystem, a CPRI interface subsystem, and an OAM subsystem. The PHY-L subsystem implements the bottom physical layer functions, including functions of FFT/IFFT, cyclic shift removal/addition, and RE demapping/mapping. The DP Group management subsystem implements the DP Group management of uplink and downlink data based on the scheduling information at the AU side. An eCPRI interface subsystem implements eCPRI-based data packet transmission with AU. A CPRI interface subsystem implements CPRI-based IQ data stream transmission with DP. Illustratively, the extension unit can be implemented by a switch, an FPGA, or the like.

As shown in FIG. 11, the remote unit (DP) includes a CPRI interface subsystem, an RF subsystem, and an OAM subsystem, the RF subsystem provides radio frequency signal processing (such as analog-to-digital conversion), and implements signal receiving and sending through an antenna. The CPRI interface subsystem implements CPRI-based IQ data stream transmission with the CP. Illustratively, the remote unit can be implemented by an integrated circuit, an FPGA, or the like.

Figure 12:
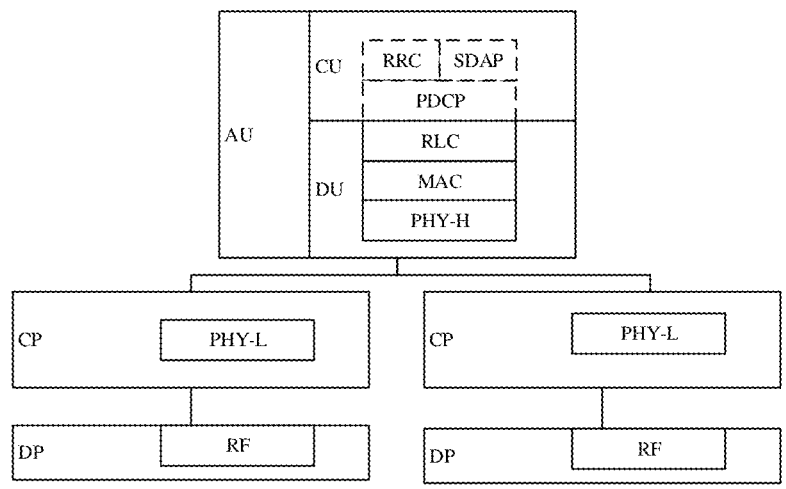
FIG. 12 is a schematic diagram illustrating function partition of a host unit provided by an embodiment.

In addition, as shown in FIG. 12, which is a schematic diagram of function partition of a host unit, an extension unit, and a remote unit provided by an embodiment, the host unit is consist of a CU (Central Unit) and a DU (Distributed Unit), the CU is responsible for implementing the protocol functions of the PDCP layer, the SDAP layer, and the RRC layer, and the DU is responsible for implementing the protocol functions of RLC, MAC, and PHY-H. The CU and the DU can be deployed together or separately. The extension unit is responsible for implementing the PHY-H protocol function. The remote unit is responsible for implementing the RF function.

Specifically, the PHY-H function includes the functions of channel estimation/equalization, layer mapping, modulation and demodulation, scrambling/descrambling, rate matching, and codec, and the PHY-L function includes the functions of IFFT/FFT, CP addition/removal, RE mapping/demapping, and precoding.

Figure 13:
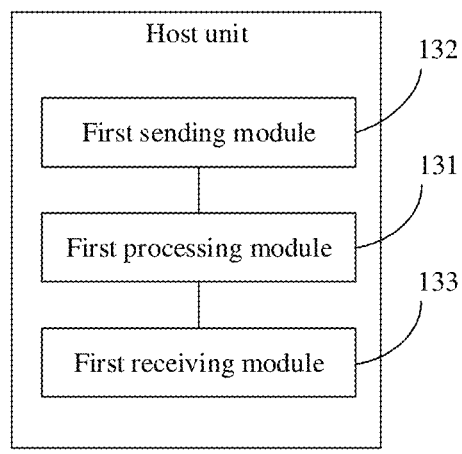
FIG. 13 is a schematic diagram illustrating a host unit in an embodiment.

Referring to FIG. 13, the present embodiment provides a host unit, applied to a base station system, the base station system includes: a host unit, a plurality of extension units, and a plurality of remote units. The host unit is communicatively connected to the extension units, each of the extension units is communicatively connected to at least one of the remote units. The remote units are configured to be communicatively connected to a user equipment to enable the user equipment to access the base station system. For any user equipment accessing the base station system, the host unit includes:

a first processing unit 131, configured to determine by the host unit a target extension unit corresponding to the user equipment from the extension units according to uplink signal respectively received from the extension units, the uplink signal sent by each extension unit being used to indicate a quality state of signaling between the remote unit connected to the extension unit and the user equipment;

a first sending unit 132, configured to send by the host unit instruction information to the target extension unit, the instruction information being used to instruct the target extension unit to send uplink data of the user equipment received from the remote unit to the host unit; and a first receiving unit 133, configured to receive by the host unit the uplink data sent by the target extension unit.

Figure 14:
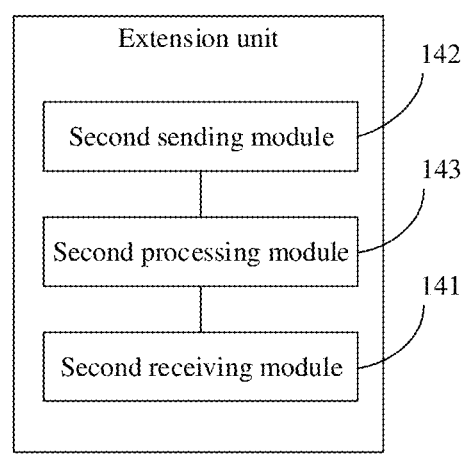
FIG. 14 is a schematic diagram illustrating an extension unit in an embodiment.

Referring to FIG. 14, the present embodiment provides an extension unit, applied to a base station system, the base station system includes: a host unit, a plurality of extension units, and a plurality of remote units. The host unit is communicatively connected to the extension units, each of the extension units is communicatively connected to at least one of the remote units. The remote units are configured to be communicatively connected to user equipment to enable the user equipment to access the base station system. For any user equipment accessing the base station system, the extension unit includes:

a second receiving unit 141, configured to receive by a target extension unit of the extension units corresponding to the user equipment instruction information from the host unit, the target extension unit being determined by the host unit according to uplink signal respectively received from the extension units, the uplink signal being used to indicate a quality state of signaling between the remote unit connected to the extension unit and the user equipment, and the instruction information being used to instruct the target extension unit to send uplink data of the user equipment received from the remote unit to the host unit; and a second sending unit 142, configured to send by the target extension unit and after receiving the uplink data sent by the remote unit the uplink data of the user equipment among the received uplink data to the host unit according to the instruction information.

Optionally, the extension unit may further include:

a second processing module 143, configured to perform low physical layer processing on the uplink data and/or downlink data of the user equipment according to a time-frequency resource position allocated to the user equipment, and perform data transmission between the user equipment and the host unit according to the low physical layer processed uplink data and/or downlink data.

It can be understood that, the above first sending module and the first receiving module, and the second receiving module and the second sending module, are corresponding to a connection relationship between the host unit and the extension unit, for example, when the host unit and the extension unit are communicating using optical fibers, each of the above modules may be a corresponding optical module.

Referring to FIG. 1, this embodiment provides a base station system, characterized by including the above host unit, a plurality of the above extension units, and a plurality of remote units. The host unit is communicatively connected to the extension units, each of the extension units is communicatively connected to at least one of the remote units.

For the specific definition of the above host unit, the extension unit, and the base station system, reference may be made to the above definition for the data transmission method, and details are not described herein again. It will be understood by those skilled in the art that the structure shown in FIGS. 13-14 is only a block diagram of a part of the structure related to the solution of the present disclosure, and does not constitute a limitation of the computer apparatus to which the solution of the present disclosure is applied. The specific computer apparatus may include more or fewer components than those shown in the figure or combinations of some components, or have different component arrangements.

In an embodiment, a readable storage medium storing a computer program is provided, and the following steps will be performed when the computer program is executed by a processor:

determining a target extension unit corresponding to the user equipment from the extension units according to uplink signal respectively received from the extension units, the uplink signal sent by each extension unit being used to indicate a quality state of signaling between the remote unit connected to the extension unit and the user equipment;

sending instruction information to the target extension unit; the instruction information is used to instruct the target extension unit to send uplink data of the user equipment received from the remote unit to the host unit; and receiving the uplink data sent by the target extension unit.

Alternatively, the following steps will be performed when the computer program is executed by the processor:

receiving instruction information from the host unit; and after receiving the uplink data sent by the remote unit, sending the uplink data of the user equipment among the received uplink data to the host unit according to the instruction information.

It will be understood by those skilled in the art that all or part of the flows in the methods of the above embodiments may be implemented by the computer programs to instruct related hardwares, and the computer programs can be stored in a non-volatile computer readable storage medium, and the flows of the embodiments of the above methods can be implemented when the computer programs are executed. Any reference to the memory, storage, database or other media used in various embodiments provided in the present disclosure may include non-volatile and/or volatile memory. A non-volatile memory may include a read only memory (ROM), a programmable ROM (PROM), an electrically programmable ROM (EPROM), an electrically erasable programmable ROM (EEPROM) or a flash memory. A volatile memory may include a random access memory (RAM) or an external cache memory. By way of illustration and not limitation, a RAM is available in a variety of forms, such as a Static RAM (SRAM), a Dynamic RAM (DRAM), a Synchronous DRAM (SDRAM), a Dual Data Rate SDRAM (DDRSDRAM), an Enhanced SDRAM (ESDRAM), a Synchlink DRAM (SLDRAM), a Rambus Direct RAM (RDRAM), a Direct Rambus Dynamic RAM (DRDRAM), a Rambus Dynamic RAM (RDRAM), and the like.

The technical features of the above embodiments may be combined arbitrarily. To simplify the description, all the possible combinations of the technical features in the above embodiments are not described. However, all of the combinations of these technical features should be considered as within the scope of the present disclosure, as long as such combinations do not contradict with each other.

The above-described embodiments merely represent several embodiments of the present disclosure, and the description thereof is more specific and detailed, but it should not be construed as limiting the scope of the present disclosure. It should be noted that, for a person of ordinary skill in the art, several variations and improvements may be made without departing from the concept of the present disclosure, and these are all within the protection scope of the present disclosure. Therefore, the protection scope of the present disclosure shall be subject to the appended claims.

What is claimed is:

1. A data transmission method, applied to a base station system including a host unit, extension units communicatively connected to the host unit, and remote units, wherein each of the extension units is communicatively connected to at least one of the remote units, wherein the remote units are adapted to communicatively connect to user equipment to enable the user equipment to access the base station system, wherein the remote units are divided into remote unit groups, and wherein each of the extension units is communicatively connected to at least one of the remote unit groups, the method comprising:

determining, by the host unit and according to uplink signals respectively received from the extension units, whether one of the remote unit groups satisfies a signal quality condition, the signal quality condition including a signal to noise ratio of a signal between the remote unit group and the user equipment is greater than a signal to noise ratio threshold, wherein the uplink signals sent by each of the extension units is used to indicate a quality state of signaling between a respective remote unit group connected to the extension unit and the user equipment;

selecting, by the host unit if there is a remote unit group that satisfies the signal quality condition, the remote unit group having the largest signal to noise ratio as a service remote unit group;

selecting, by the host unit if there is no remote unit group that satisfies the signal quality condition, the remote unit groups at a top of a descending order of signal to noise ratios by which the remote unit groups are arranged, as the service remote unit group;

determining, by the host unit, the extension unit connected to the service remote unit group as a target extension unit;

sending, by the host unit, instruction information to the target extension unit, the instruction information used to instruct the target extension unit to send uplink data of the user equipment received from the remote unit to the host unit; and receiving, by the host unit, the uplink data sent by the target extension unit.

2. The method of claim 1, further comprising:
sending, by the host unit, downlink data to the target extension unit, wherein the downlink data is data to be sent by the host unit to the user equipment.

3. The method of claim 1, wherein the instruction information includes an identifier of the service remote unit group.

4. The method of claim 1, wherein the receiving, by the host unit, the uplink data sent by the target extension unit comprises: receiving, by the host unit the uplink data from the target extension unit sent by the service remote unit group, the uplink data sent by the user equipment to the service remote unit group; and performing, by the host unit, diversity and combining processing on the uplink data sent by the service remote unit group.

5. The method of claim 1, wherein the service remote unit group includes a first service remote unit group and a second service remote unit group, wherein the first service remote unit group is communicatively connected to a first extension unit of the extension units, wherein the second service remote unit group is communicatively connected to a second extension unit of the extension units, wherein the first extension unit is communicatively connected to the host unit, wherein the second extension unit is communicatively connected to the first extension unit, and wherein the target extension unit includes the first extension unit.

6. The method of claim 1, wherein the host unit and the extension unit are connected through enhanced Common Public Radio Interface.

7. A data transmission method, applied to a base station system including a host unit, extension units communicatively connected to the host unit, and remote units, wherein each of the extension units is communicatively connected to at least one of the remote units, wherein the remote units are configured to communicatively connect to user equipment to enable the user equipment to access the base station system, wherein the remote units are divided into remote unit groups, and wherein each of the extension units is communicatively connected to at least one of the remote unit groups, the method comprising:

receiving, by a target extension unit of the extension units corresponding to the user equipment, instruction information from the host unit, wherein the target extension unit is communicatively connected to a service remote unit group corresponding to the user equipment, the service remote unit group determined by the host unit according to uplink signals respectively received from the extension units, wherein the uplink signals sent by one of the extension units are used to indicate a quality state of signaling between each of the remote unit groups connected to the extension unit and the user equipment, and wherein the instruction information includes an identifier of the service remote unit group and is used to instruct the target extension unit to send uplink data of the user equipment received from the remote unit to the host unit;

parsing, by the target extension unit, the uplink data of the user equipment from the uplink data sent by the service remote unit group according to the identifier of the service remote unit group and a time-frequency resource position corresponding to uplink scheduling information of the user equipment; and sending, by the target extension unit, the uplink data of the user equipment to the host unit.

8. The method of claim 7, further comprising:
receiving, by the target extension unit, downlink data from the host unit, wherein the downlink data is data to be sent by the host unit to the user equipment; and
sending, by the target extension unit, the downlink data to the user equipment through a remote unit connected to the target extension unit according to the instruction information.

9. The method of claim 7, wherein the parsing of the uplink data of the user equipment from the uplink data sent by the service remote unit group comprises: performing, by the target extension unit, low physical layer processing on radio frequency signal sent by the service remote unit group according to the time-frequency resource position corresponding to the uplink scheduling information of the user equipment, to obtain low physical layer (PHY-L) processed symbol data, wherein the radio frequency signal carries the uplink data.

10. The method of claim 7, wherein the sending, by the target extension unit, the downlink data to the user equipment through a remote unit connected to the target extension unit according to the instruction information comprises: sending, by the target extension unit and according to the identifier of the service remote unit group, the downlink data to the user equipment through the service remote unit group on a time-frequency resource position corresponding to downlink scheduling information of the user equipment.

11. A host unit, applied to a base station system including extension units communicatively connected to the host unit, and remote units, wherein each of the extension units is communicatively connected to at least one of the remote units, and wherein the remote units are configured to communicatively connect to user equipment to enable the user equipment to access the base station system, wherein the remote units are divided into remote unit groups, wherein each extension unit is communicatively connected to at least one of the remote unit groups, the host unit comprising: a first processing unit, adapted to select by the host unit, at least one remote unit group from the remote unit groups as a service remote unit group corresponding to the user equipment according to uplink signals respectively received from the extension units, the uplink signals sent by each of the extension units used to indicate a quality state of signaling between a respective remote unit group connected to the extension unit and the user equipment, and the first processing unit, further adapted to determine by the host unit, the extension unit connected to the service remote unit group as a target extension unit; a first sending unit, adapted to send by the host unit, instruction information to the target extension unit, the instruction information used to instruct the target extension unit to send uplink data of the user equipment received from the remote unit to the host unit; and a first receiving unit, adapted to receive by the host unit, the uplink data sent by the target extension unit wherein the service remote unit group comprises a first service remote unit group and a second service remote unit group, wherein the first service remote unit group is communicatively connected to a first extension unit of the extension units, wherein the second service remote unit group is communicatively connected to a second extension unit of the extension units, wherein the first extension unit is communicatively connected to the host unit, wherein the second extension unit is communicatively connected to the first extension unit, and wherein the target extension unit includes the first extension unit.

12. A base station system including a host unit, extension units communicatively connected to the host unit, and remote units, wherein each of the extension units is communicatively connected to at least one of the remote units, wherein the remote units are configured to communicatively connect to user equipment to enable the user equipment to access the base station system, wherein the remote units are divided into remote unit groups, and wherein each of the extension units is communicatively connected to at least one of the remote unit groups, the system comprising:

a receiving unit adapted to receive by a target extension unit of the extension units corresponding to the user equipment, instruction information from the host unit, wherein the target extension unit is communicatively connected to a service remote unit group corresponding to the user equipment, wherein the service remote unit group is determined by the host unit according to uplink signals respectively received from the extension units, wherein the uplink signals sent by one of the extension units are used to indicate a quality state of signaling between each of the remote unit groups connected to the extension unit and the user equipment, and wherein the instruction information includes an identifier of the service remote unit group and is used to instruct the target extension unit to send uplink data of the user equipment received from the remote unit to the host unit; and a sending unit adapted to parse, by the target extension unit, the uplink data of the user equipment from the uplink data sent by the service remote unit group according to the identifier of the service remote unit group and a time-frequency resource position corresponding to uplink scheduling information of the user equipment, and the sending unit adapted to send, by the target extension unit, the uplink data of the user equipment to the host unit.

13. The base station system of claim 12, further comprising:

a processing module, adapted to perform low physical layer processing on the uplink data and/or downlink data of the user equipment according to a time-frequency resource position allocated to the user equipment and perform data transmission between the user equipment and the host unit according to the low physical layer processed uplink data and/or downlink data.

* * * * *